United States Patent

Nishizawa et al.

[11] Patent Number: 5,860,494
[45] Date of Patent: Jan. 19, 1999

[54] VIBRATION DAMPER FOR USE IN DISK BRAKE

[75] Inventors: Yukio Nishizawa; Shiro Nakajima, both of Itami, Japan

[73] Assignee: Sumitomo Electric Industries, Ltd., Osaka, Japan

[21] Appl. No.: 902,099

[22] Filed: Jul. 29, 1997

Related U.S. Application Data

[62] Division of Ser. No. 661,726, Jun. 11, 1996, Pat. No. 5,687,818.

[30] Foreign Application Priority Data

| Jun. 13, 1995 | [JP] | Japan | 7-146304 |
| Jul. 6, 1995 | [JP] | Japan | 7-179026 |
| Apr. 18, 1996 | [JP] | Japan | 8-96856 |

[51] Int. Cl.⁶ .................................................. F16D 65/38
[52] U.S. Cl. ........................................ 188/73.35; 188/72.4
[58] Field of Search .............................. 188/73.35, 73.36, 188/73.37, 72.4, 72.1, 250 E, 264 G, 256, 258

[56] References Cited

U.S. PATENT DOCUMENTS

4,602,702  7/1986  Ohta et al. ............................ 188/72.1

FOREIGN PATENT DOCUMENTS

| 4-54324 | 2/1992 | Japan | 188/73.35 |
| 4-54325 | 2/1992 | Japan | 188/73.35 |

*Primary Examiner*—Peter M. Poon
*Attorney, Agent, or Firm*—Wenderoth, Lind & Ponack, L.L.P.

[57] ABSTRACT

A is a vibration damper suppresses squeaks of a disk brake by positively damping vibrations of the brake. It is a high-performance, highly reliable vibration damper with no accurate machining required. This vibration damper has pressing pistons received in brake pistons so that brake fluid pressure acts thereon. It further includes a vibration detector for detecting brake vibrations through one of two pads, and a vibration imparter for vibrating the other pad based on detection signals of the vibration detector so as to cancel out the vibrations detected by the vibration detector. They are pressed against the back of the respective pads by the respective pressing pistons. By pressing them at a suitable pressure against the pads, it is possible to detect vibrations and vibrate the pads with high reliability. When replacing the pads, they never protrude from the pad pressing surfaces, so that they are less likely to be damaged or destroyed.

6 Claims, 10 Drawing Sheets

VIBRATION DAMPER FOR USE IN DISK BRAKE

This is a divisional application of Ser. No. 08/661,726, filed Jun. 11, 1996 now U.S. Pat. No. 5,687,818.

BACKGROUND OF THE INVENTION

The present invention relates to a vibration damper for use in a disk brake to prevent the disk brake from squeaking by damping its vibration, a leading cause of squeaking, in a positive manner.

Unexamined Japanese Patent Publications 4-54324 and 4-54325 disclose such vibration dampers for positively preventing squealing of the disk brake in a positive manner. Either of these vibration dampers has a piezoelectric element for detecting the vibration of the pads and vibrating the pads in such a direction as to cancel out their vibration based on the detection signals, thereby damping the vibration of the brake.

If in such a prior art device a piezoelectric element is used to directly detect the vibration of the pads and directly vibrate the pads, the piezoelectric element 1 is buried in a caliper 2 as shown in FIG. 1A so as to press one of the pads 3.

In this arrangement, the force with which the piezoelectric element 1 presses the pad 3 depends upon the length A of the portion of the piezoelectric element buried in the caliper. If the length A is too long compared to the thickness of the piezoelectric element, it is impossible to press the pad 3 with the piezoelectric element 1 and thus detect the vibration and impart vibration to the pads. If too short, the pad 3 is pressed solely by the piezoelectric element, causing stress concentration in the piezoelectric element 1. Such stress concentration may lead to the destruction of the piezoelectric element 1. As described above, in the conventional arrangement, the length of the portion of the piezoelectric element 1 buried in the caliper largely influences the vibration detecting and imparting function of the vibration damper as well as its reliability. Thus, it is necessary to machine this portion with an accurate length.

Also, as shown in FIG. 1B, in the prior art arrangement, the piezoelectric element 1 buried in the caliper protrudes from the pad pressing surface of the caliper when the pads are removed. Thus, it tends to be caught by a pad and broken when replacing the pad.

An object of the present invention is to solve these problems.

SUMMARY OF THE INVENTION

According to the present invention, there is provided a vibration damper for use in a disk brake comprising a vibration detecting means for detecting vibrations of the disk brake through their pads, and a vibration imparting means for imparting vibration to the pads so as to cancel out the vibrations of the brake based on detection signals from the vibration detecting mean. The vibration damper further compresses comprising at least one pressing piston which receives at its back brake fluid pressure for pressing the vibration detecting means and the vibration imparting means against the back of at least one of the pads of the disk brake O.

For a simpler structure and lower manufacturing cost, the vibration detecting means and the vibration imparting means may be pressed against the back of one of the pads of the brake by a single pressing piston (A), or only the vibration detecting means may be pressed by the pressing piston (B). In the latter case, a vibration imparting means capable of vibrating the pads while kept out of contact with the pads is used. Otherwise, only the vibration imparting means may be pressed by the pressing piston. In this case, a vibration detecting means detects vibrations of the pads while being kept out of contact with the pads, or it; may be mounted on one of the pads to detect vibrations of the pads (C).

In any of the arrangements, the pressing piston is preferably received in a brake piston (D).

More preferably, the area of the pressure receiving rear surface of the pressing piston is so adjusted that the surface pressure at which the vibration detecting means and the vibration imparting means are pressed against one of the pads by the pressing piston is equal to the surface pressure at which the brake piston is pressed against the one of the pads (E).

In another arrangement, the pressing piston has in the front surface thereof a recess in which are received the vibration detecting means and the vibration imparting means so that when the vibration detecting means and the vibration imparting means are pressed against the back of one of the pads, a clearance smaller than the remaining stroke of the pressing piston is present between the pressing piston and the back of the pad (F). This vibration damper may further comprise a rubber cap put on the front end of the pressing piston, and is with a through hole for holding the vibration detecting means and the vibration imparting means in position by receiving these means in the through hole (G).

In the present invention, since the vibration detecting means and the vibration imparting means are pressed against the back of one of the pads by the pressing piston, no adjustment of the length A shown in FIG. 1A is necessary. It is possible to detect vibrations of the pads and impart vibrations to the pads with high accuracy without the need for accurate machining of various parts of the brake. Since the pressing piston is pushed back as soon as the braking pressure is removed, both means will never protrude from the pad pressing surfaces.

In the arrangement in which the vibration detecting means and the vibration imparting means are pressed by a single common piston, it is possible to simplify the structure of the vibration damper and to reduce its manufacturing cost, though the vibration detecting accuracy and the vibration imparting efficiency may slightly drop.

The arrangement in which the vibration detecting means is pressed against the back of one of the pads by the piston with the vibration imparting means vibrating the pads while being kept out of contact with the pads, is the same in function as (O) above. While the non-contact type vibration imparting means is low in the efficiency compared with a contact type vibration imparting means, it can be manufactured at a low cost and takes up less space because it needs no pressing piston.

The arrangement in which the vibration imparting means is pressed against the back of one of the pads with the vibration detecting means detecting vibrations of the pads in a non-contact manner or mounted on the other pad is functionally the same as the arrangement of (B) above. Such a non-contact type vibration detecting means is low in detecting accuracy compared with a contact type detecting means. Also, the vibration detecting means mounted on one of the pads has to be detached from the pad and reattached to a new pad when the pad has to be replaced.

In the arrangement in which the pressing piston is received in a brake piston, the brake piston can be used as a cylinder for the pressing piston. Since the pressing piston is housed in the space in the brake piston, no extra space is needed to mount the pressing piston.

If the surface pressure at which the vibration detecting means and the vibration imparting means are pressed against the pads is lower than the surface pressure at which the brake pistons are pressed against the pads, the vibration detection signals weaken and the oscillating efficiency drops, making it difficult to effectively suppress brake squeaks.

On the other hand, if the surface pressure at which the vibration detecting means and the vibration imparting means are pressed against the pads is higher than the surface pressure at which the brake pistons are pressed against the pads, the surface pressure will increase excessively only at the vibration detection point and the vibration imparting point, making it difficult to stably press the pads. Vibrations of the pads resulting from such an unstable state of the pads will also be detected by the vibration detecting means so that it becomes difficult to accurately vibrate the pads to cancel out the vibration of the pads that can cause squeaks of the brake.

The arrangement of E is free of these problems because the surface pressure applied by the pressing pistons is equal to the surface pressure applied by the brake pistons. Thus, squeaks can be suppressed most effectively.

The arrangement of F serves as a kind of fail-safe mechanism. That is, if the vibration detecting means or the vibration imparting means should be broken, the pressing piston comes into direct contact with and presses the pad. With this arrangement, since the brake piston never moves markedly, there will be no sharp drop in the brake fluid pressure. Thus, the braking properties, especially the stroke of the brake pedal, will remain unchanged, so that the brake can be operated safely.

In the arrangement of G, the vibration detecting means and the vibration imparting means, which are received in the recesses of the pressing pistons, are held in position by the rubber caps put on the heads of the pressing pistons by fitting them in holes formed in the rubber caps. Thus, they can be easily held in position. If these means are bonded or otherwise fixed to the pressing pistons, they may be destroyed due to the torque (shearing force) transmitted from the rotor during braking. In this arrangement, the vibration detecting means and the vibration imparting means are held in position by the rubber caps. When braking torque is applied to them, the rubber caps will deform, allowing slight lateral movement of these means. Due to such slight movement of these means, the torque applied to them is substantially weakened, so that they are less likely to be destroyed by braking torque.

In any of the above arrangements, by selecting pressing pistons with a suitable diameter, it is possible to set the pressing force applied by the pressing pistons to an optimum value and thus to prevent breakage of the vibration detecting means and the vibration imparting means due to excessive pressure.

According to this invention, there is also provided a vibration damper for a disk brake including a disk and pads provided on both sides of said disk and each adapted to be pressed by a plurality of pistons against the disk. The vibration damper comprises a vibration detecting means for detecting vibrations of the brake through the pads, and a vibration imparting means for imparting vibrations to said pads so as to cancel out the vibrations of the brake based on detection signals from the vibration detecting means. At least one of the vibration detecting means and the vibration imparting means are provided in plural, the vibration detecting means and the vibration imparting means being received in the respective pistons.

The vibration detecting means and the vibration imparting means are received in a plurality of pistons provided on each side of the disk, so that it is not necessary to form mounting portions for these means on the caliper. With this arrangement, vibration detecting points and vibration imparting points can be increased easily while not increasing the mounting space of the brake to damp vibrations (and suppress brake squeaks).

Dampers in preferable forms are listed below:

(1) A vibration damper for a disk brake wherein a plurality of the vibration detecting means are provided on one side of the disk, and wherein the vibration imparting means is controlled based on a signal obtained by summing detection signals produced from the plurality of vibration detecting means.

In this arrangement, only one signal processing unit is needed. Although this vibration damper is simple in structure, it can suppress vibrations effectively because data on vibrations of the disk are collected from a plurality of points.

(2) A vibration damper for a disk brake wherein the vibration detecting means are provided on both sides of the disk, and wherein the vibration imparting means is controlled based on a difference between detection signals from the vibration detecting means provided on both sides of the disk.

The vibration damper in this arrangement differs from the above-mentioned arrangement in that the vibration imparting means is controlled based on the difference between signals from two vibration detecting means provided on both sides of the disk. But this vibration damper functions the same way and achieves the same results as the second arrangement.

(3) A vibration damper for a disk brake comprising a plurality of vibration damper mechanisms each comprising one vibration detecting means and one vibration imparting means received in pistons provided opposite to each other on both sides of the disk, the plurality of vibration damper mechanisms being operable for detecting and imparting vibrations independently of one another.

The vibration imparting means of each vibration damper mechanism imparts vibrations to the disk at the same point at which vibrations of the disk are detected by the vibration detecting means provided opposite to this vibration imparting means. With this arrangement, vibrations of the disk and brake squeaks are damped more effectively.

(4) A vibration damper for a disk brake comprising one vibration detecting means, and a plurality of the vibration imparting means controlled based on a detection signal from the single vibration detecting means.

Since a plurality of vibration imparting means are controlled by a single vibration detecting means and a single signal processing circuit, it is possible to damp vibrations at a low cost.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1A:
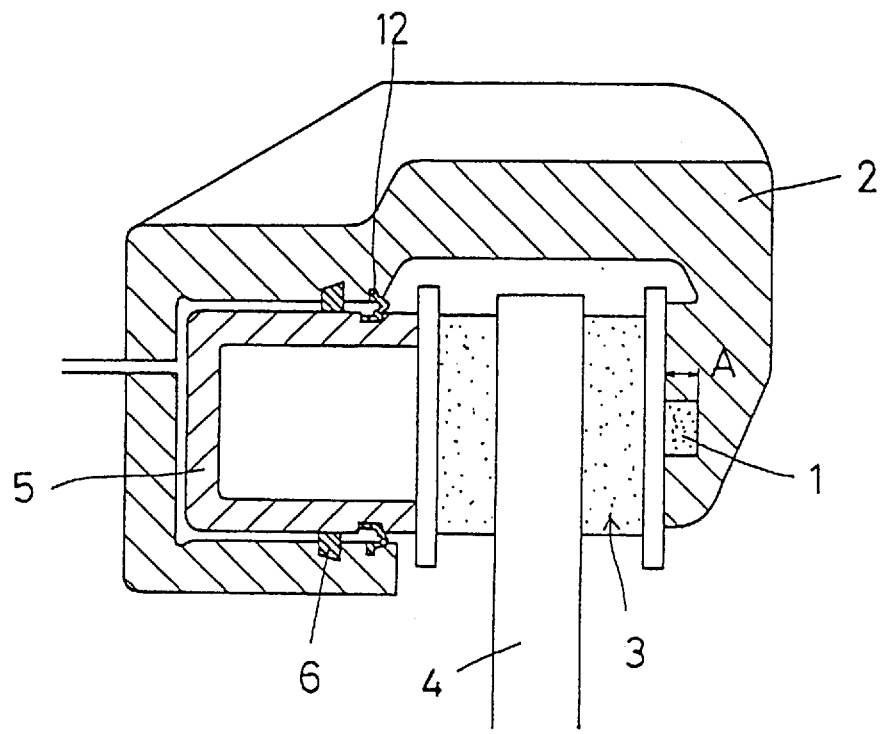
FIG. 1A is a sectional view of a conventional vibration damper.
Figure 1B:
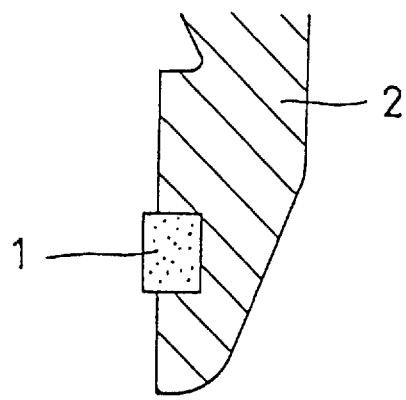
FIG. 1B is a view of a piezoelectic element, illustrating how it protrudes when the pads are removed.
Figure 2A:
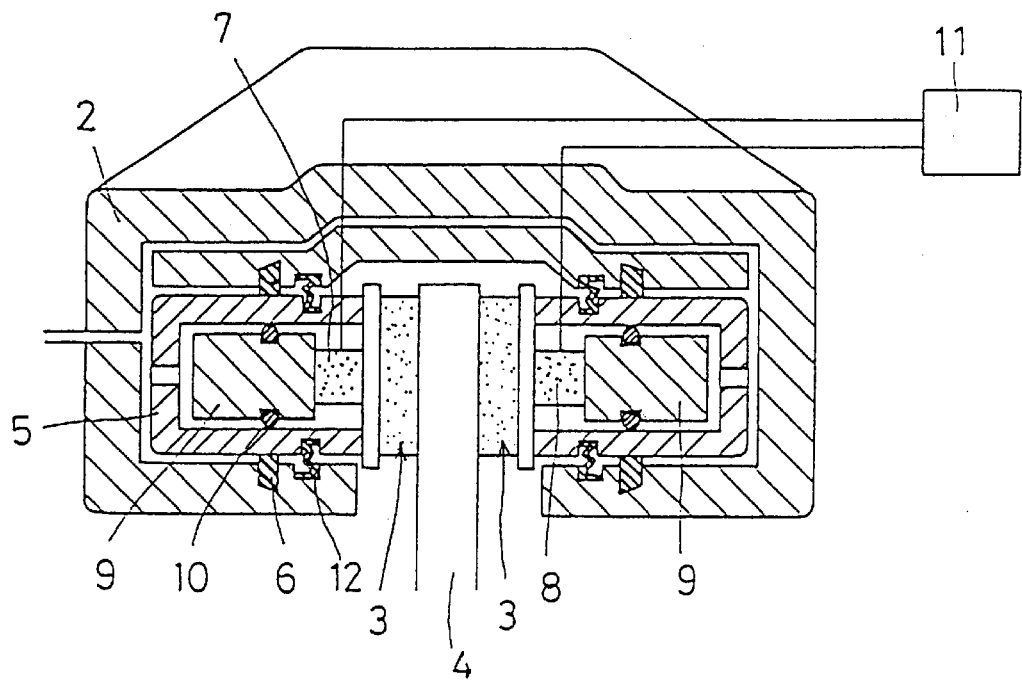
FIG. 2A is a sectional view of a vibration damper of a first embodiment.

FIG. 2 shows a first embodiment of the present invention, which is applied to a piston-opposed type caliper 2. As shown in FIG. 2, a pressing piston 9 is received in each brake piston 5. A vibration detecting means 7 and a vibration imparting means 8 are bonded or otherwise fixed to the respective pressing pistons 9 to press them against the respective pads 3. In the embodiment, laminated piezoelectric elements are used as the vibration detecting means 7 and the vibration imparting means 8. But the vibration detecting means 7 may be one having a strain gauge attached thereto. Also, the vibration imparting means 8 may be of a type that directly vibrates a pad carrying a magnet or a magnetizable member with a magnetic force. The disk brake further includes a disk 4 against which the pads 3 are pressed, and a piston boot 12.

The pressing pistons 9 are received in the respective brake pistons 5 with a gap between the pistons 9 and 5 sealed with a seal 10 so as to be slidable in the axial direction of the disk. Brake fluid pressure in a fluid chamber formed in the caliper 2 is introduced into each brake piston 5 through a hole formed in the rear wall thereof and acts upon the rear face of the pressing piston 9. Urged by this brake fluid pressure, the pistons 9 advance to press the vibration detecting means 7 and the vibration imparting means 8 against the backs of the respective pads 3. Thus, the machining accuracy of various parts of the brake will have no influence on the pressure at which the means 7 and 8 are pressed against the pads 3. Thus, even if the means 7 and 8 are not very accurate in e.g., their thicknesses, it is possible to detect vibration of the brake and vibrate the brake with high accuracy.

Another advantage of this arrangement is that the vibration detecting means 7 and the vibration imparting means 8 never protrude from the end faces (pad pressing surfaces) of the brake pistons 5, so that they are unlikely to be damaged when the pads are replaced.

Also, since the pressing pistons 9 are mounted in the brake pistons 5, it is not necessary to find extra installation space for the pistons 9. Thus, the provision of the pistons 9 never increases the size of the entire brake.

The holes formed in the rear walls of the brake pistons 5 reduce the pressure acting area of the brake pistons. But in effect, the pressing pistons 9 completely compensate for such reduction in the pressure acting area of the braking pistons, so that the pressure acting upon each pad will remain unchanged. That is, the holes will not affect the braking ability. Rather, with this arrangement, it is possible to protect the vibration detecting means 7 and the vibration imparting means 8 against excessive pressures because the pad pressing force is borne not only by the brake pistons 5 but also by the pressing pistons 9, and thus the pressures applied to the means 7 and 8 decrease.

Figure 2B:
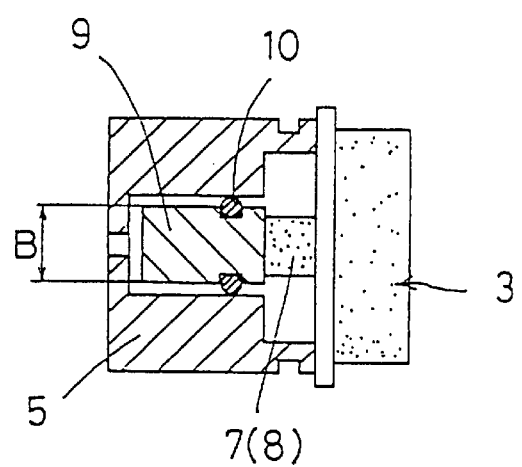
FIG. 2B is a view illustrating how a pressing force by a piston is adjusted.

As shown in FIG. 2B, by varying the pressure acting area B of each pressing piston 9, it is possible to adjust the pressure at which the vibration detecting means 7 or the vibration imparting means 8 is pressed against the back of the respective pad 3. This arrangement makes it possible to maximize the vibration detecting and imparting efficiency while keeping the pad pressing force at an optimum level, taking into account the stress resistance of the means 7 and 8.

The vibration damper of this embodiment has a control circuit 11 which receives brake vibration signals detected by the vibration detecting means 7 and vibrates the pads by means of the vibration imparting means 8 based on the detection signals to damp the vibration and squeaks of the brake. Specifically, the control circuit 11 adjusts the gain and phase of the detection signals to produce vibrating signals, and damps the vibration of the brake by inducing vibration of the pads that is opposite in phase to the brake vibration.

Figure 3:
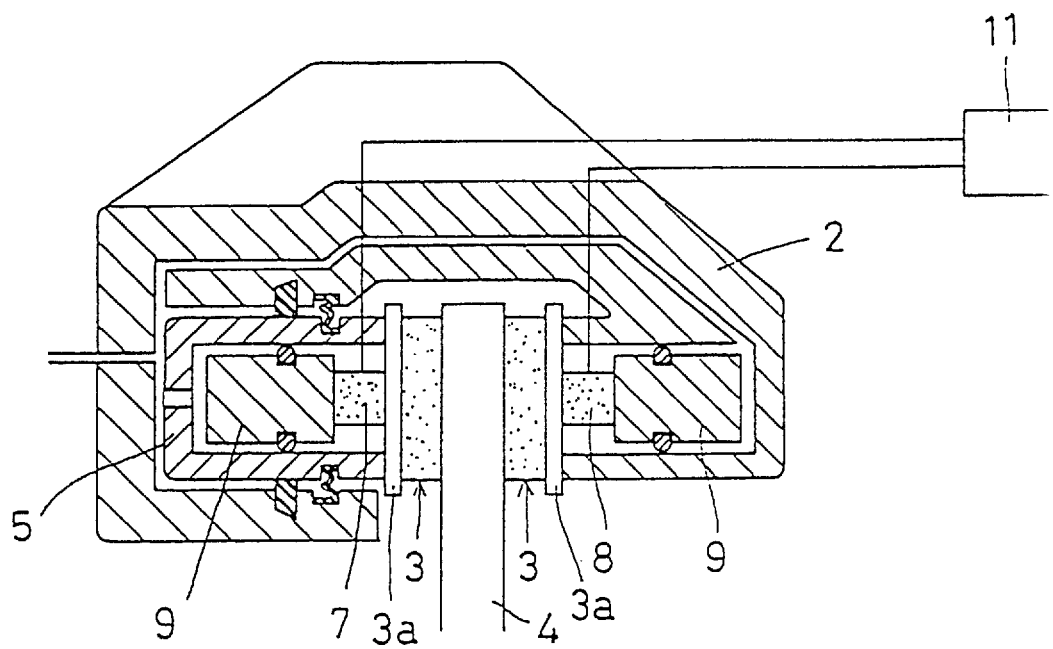
FIG. 3 is a sectional view of a vibration damper of a second embodiment.

FIG. 3 shows a second embodiment, which is applied to a floating caliper 2. Since the caliper 2 is afloat, a cylinder is additionally formed in the caliper on its outer side to receive one of the pressing pistons 9 by which the vibration imparting means 8 is pressed. On the inner side of the caliper, this embodiment is the same as the first embodiment. But the vibration detecting means 7 may be provided on the outer side with the vibration imparting means 8 provided on the inner side. Functionally, this arrangement is not different from the arrangement of FIG. 3. The same is true for the first embodiment.

Figure 4:
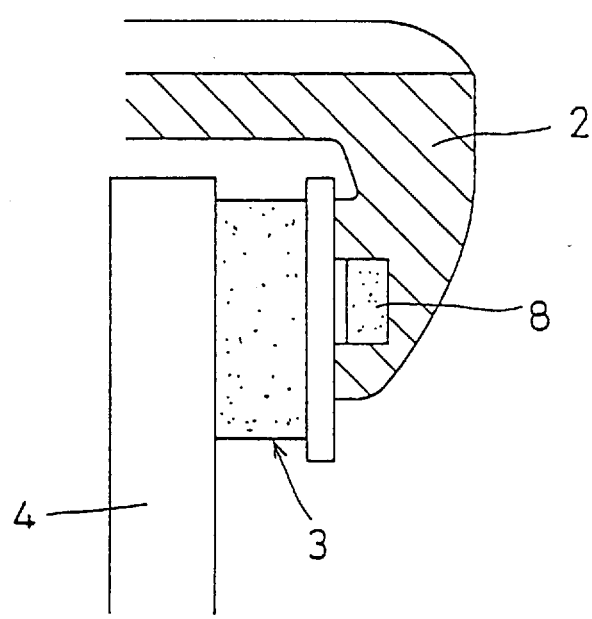
FIG. 4 is a partial sectional view of a vibration damper of a third embodiment.

FIG. 4 shows a third embodiment. The vibration damper of this embodiment has a vibration imparting means 8 for vibrating the pads 3 in a non-contact manner, such as an electromagnetic vibrator. It is received in a recess formed in a floating caliper 2 on its outer side. Though not shown, the other portions are the same in structure as the second embodiment shown in FIG. 3. The vibration damper of this embodiment needs no pressing piston on the outer side, so that it is not necessary to form a cylinder for receiving a piston and an oil passage for connecting to the opposite cylinders. Thus, it can be manufactured at a lower cost and needs less installation space. In this embodiment, the vibration imparting means 8 is an electromagnetic vibration imparting means for vibrating the pads in a non-contact manner, utilizing a magnetic force. This is possible because the back plates 3a of the pads are made of iron (which is a magnetizable material). This vibration imparting means is inferior in vibrating efficiency relative to the direct vibration imparting means because it is a non-contact type vibrator.

But if the cost and the brake size are important, this vibration imparting means is advantageous.

Instead of the vibration imparting means 8 shown in FIG. 4, a vibration detecting means may be mounted in the caliper to detect vibration in a non-contact manner, with the vibration imparting means 8 pressed by the pressing piston received in the brake piston so as to press and vibrate the pads. The detecting means for detecting vibration in a non-contact manner may be an eddy current vibration detector, utilizing the fact that the back plates 3a of the pads are made of iron (a magnetic conductor). In this case as well, similar to the third embodiment, the detecting efficiency is lower compared to direct detection because detection is made in a non-contact manner.

Figure 5A:
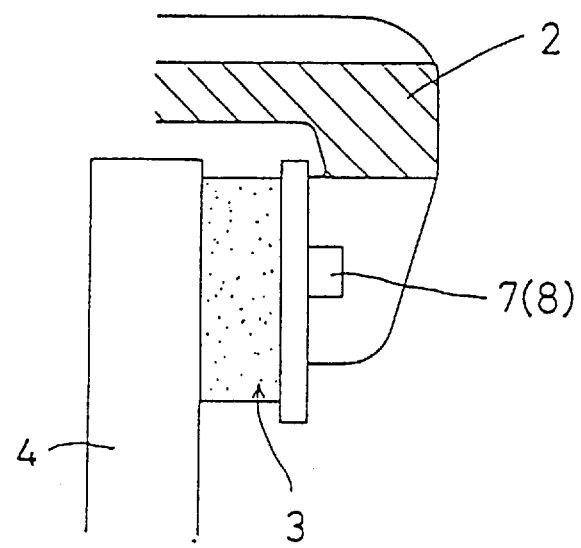
FIG. 5A is a sectional view of a portion of a vibration damper of a fourth embodiment.
Figure 5B:
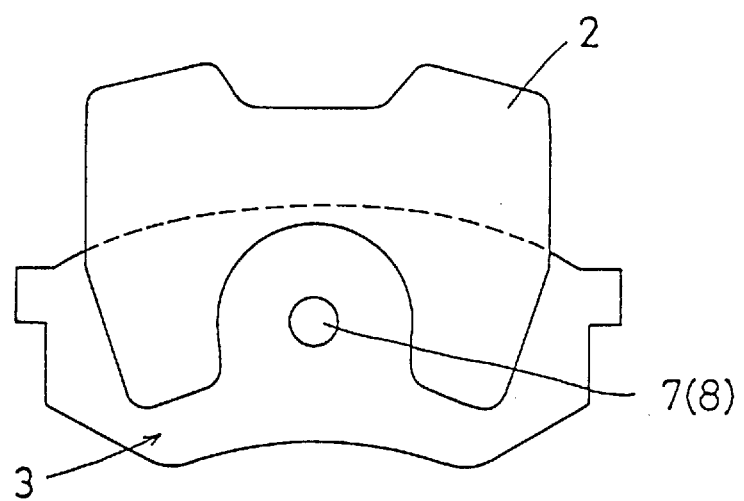
FIG. 5B is an end view of a portion of FIG. 5A as viewed from an outer side.

In a fourth embodiment shown in FIGS. 5, the vibration detecting means 7 is bonded to one of the pads 3 to directly detect vibration. In this case, when replacing the pads, the vibration detecting means 7 has to be detached from the pad and reattached to a new pad. In this embodiment, an acceleration detector is used as the vibration detecting means 7.

Figure 6:
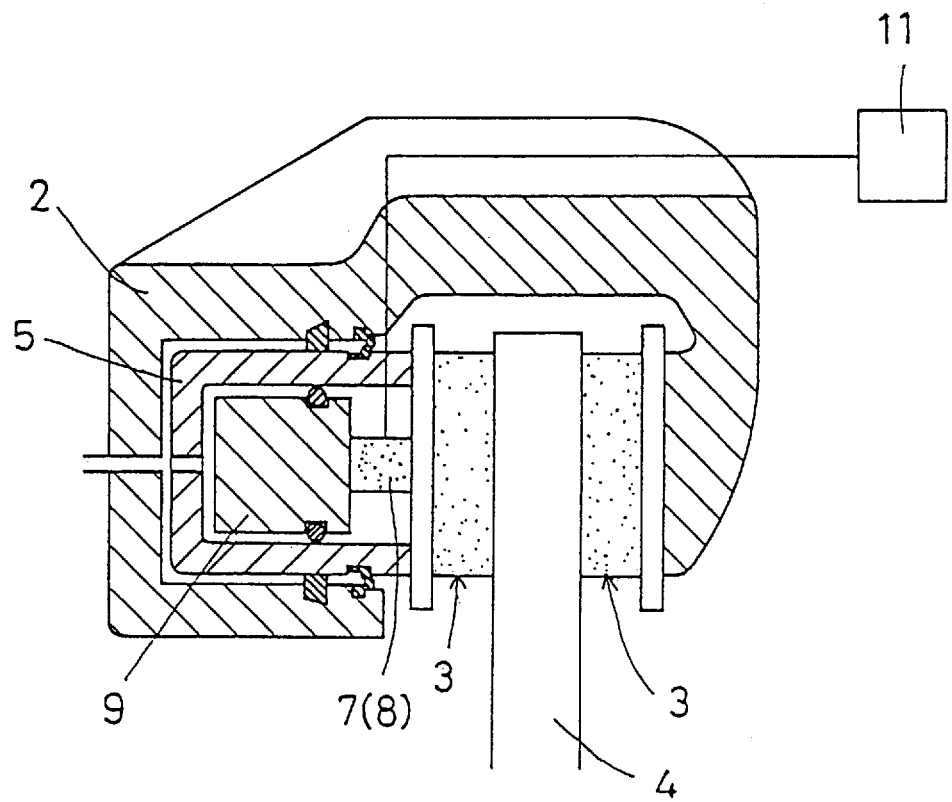
FIG. 6 is a sectional view of a vibration damper of a fifth embodiment.

FIG. 6 shows a fifth embodiment. In this embodiment, a single pressing piston 9 presses both of the vibration detecting means 7 and the vibration imparting means 8 against one of the pads 3. This arrangement is advantageous in that the manufacturing cost is low and the installation space is small. In this embodiment, a single piezoelectric element is used both as the vibration detecting means 7 and the vibration imparting means 8. Since only one piezoelectric element is needed, the vibration damper of this embodiment can be manufactured at a still lower cost. But since the only one piezoelectric element is not used solely to detect vibration or solely to vibrate the pads, its vibration detecting and imparting efficiency are not very good.

Figure 7:
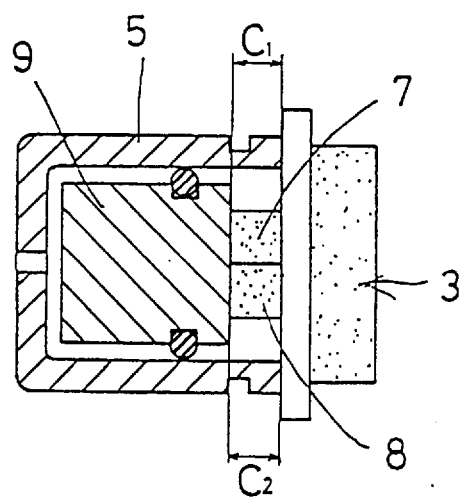
FIG. 7 is a partial sectional view of a vibration damper of a sixth embodiment.

In a sixth embodiment shown in FIG. 7, a vibration detecting means 7 and a vibration imparting means 8 are mounted side by side and pressed by a singe pressing piston 9 against the back of one of the pads 3. In this arrangement, it is important to adjust the length C1 of the vibration detecting means 7 and the length C2 of the vibration imparting means 8 with high accuracy. If the length C1 is greater than the length C2, the vibration imparting means 8 cannot be pressed against the pad at a sufficiently high pressure, so that the vibration imparting efficiency will drop. If C2 is greater than C1, the vibration detecting means 7 cannot be pressed hard against the pad. The vibration detecting accuracy thus drops.

Figure 8:
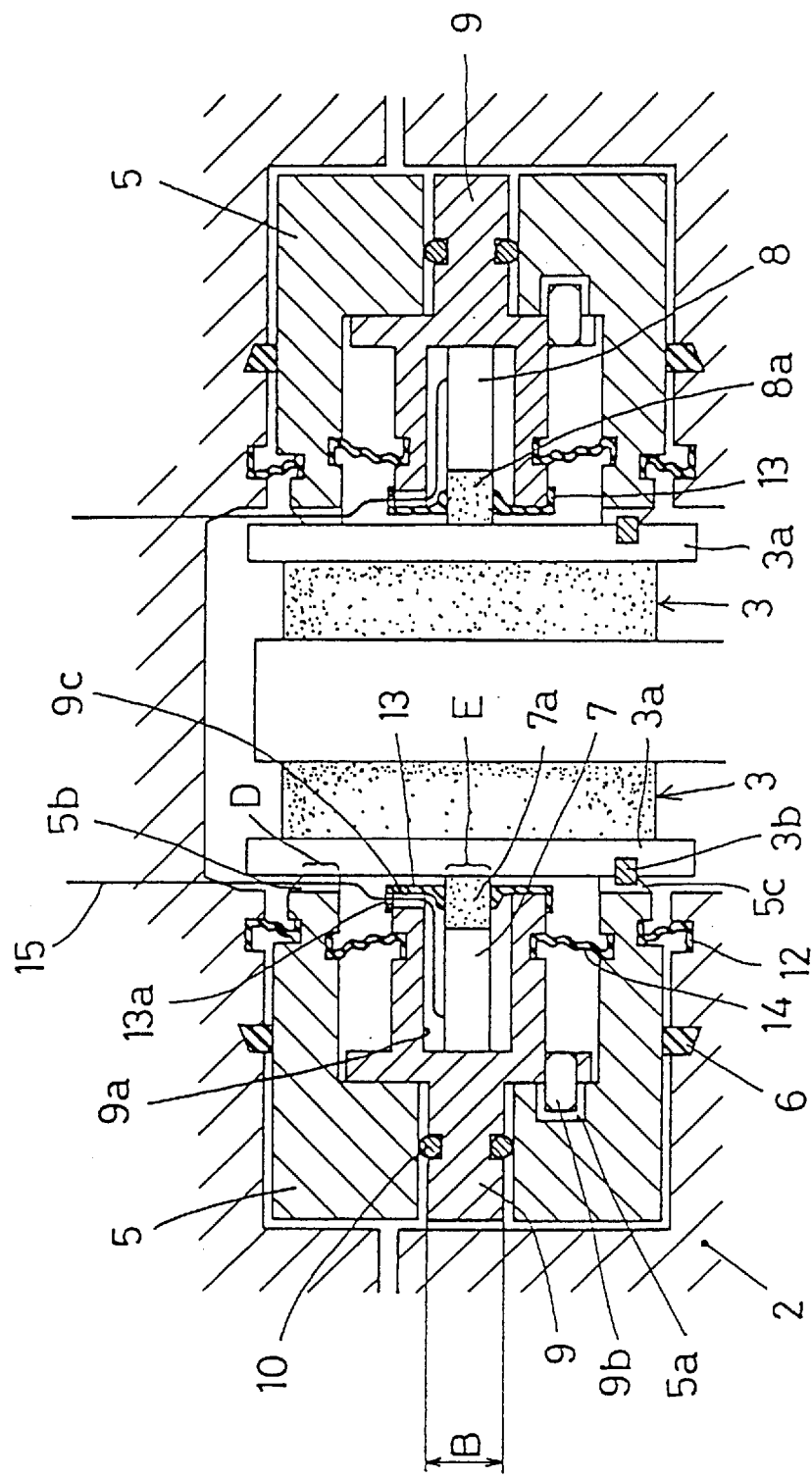
FIG. 8 is a partial sectional view of a vibration damper of a seventh embodiment.

FIG. 8 shows a seventh embodiment. The vibration damper of FIG. 8 is considered to be the most desirable of all the embodiments. In the illustrated example, the vibration damper is applied to a piston-opposed type caliper 2. But it can be applied to a floating caliper as shown in FIGS. 2 or 6.

The vibration detecting means 7 and the vibration imparting means 8 used here are laminated piezoelectric elements. In order to protect them against braking heat transmitted from the pads 3, heat insulating members 7a and 8a are provided between the piezoelectric elements and the pads by bonding them to one end of the piezoelectric elements with a thermosetting adhesive.

The means 7 and 8 are pressed against the backs of the pads 3 by pressing pistons 9 received in the brake pistons 5. The brake shown in FIG. 8 is so designed that the surface pressure at which the vibration detecting means 7 and the vibration imparting means 8 are pressed against the pads 3 (surface pressure at portion E in FIG. 8) is equal to the surface pressure at which the brake pistons 5 are pressed against the pads 3 (surface pressure at portion D in FIG. 8). The surface pressures at portions E and D can be made equal by adjusting the pressure acting surface area B of each pressing piston 9. By adjusting the ratio between the surface pressures at portions D and E to 1, the damping effect becomes maximum for the reasons we have already explained in detail in the description of the function of the invention.

Figure 9:
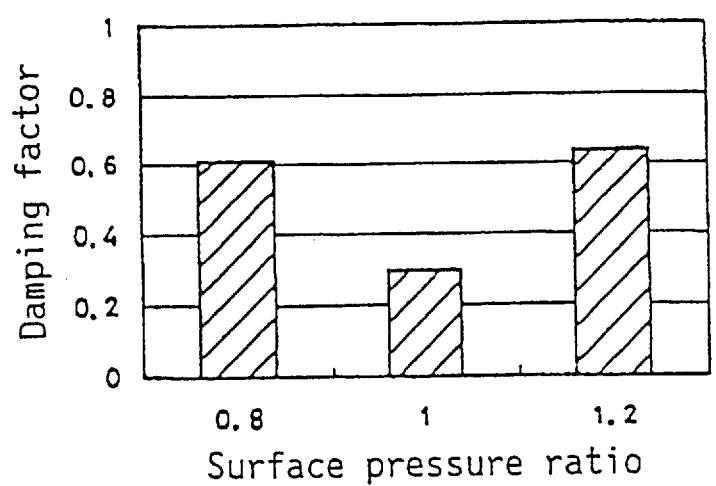
FIG. 9 is a graph showing the relationship between the surface pressure ratio and the vibration damping factor.

FIG. 9 shows the relationship between the above surface pressure ratio and the damping factor of brake vibration, a leading cause of brake squeaks. The damping factor is the ratio of the brake vibration when the brake is equipped with the vibration damper of the present invention to the brake vibration when the brake is equipped with no such vibration damper. As shown, when the surface pressure ratio is 1, the damping factor is the minimum, so that brake squeaks are minimum too.

In the arrangement of FIG. 8, the vibration detecting means 7 and the vibration imparting means 8 are mounted in recesses 9a formed in the front ends of the pressing pistons 9. With the means 7 and 8 pressed against the backs of the pads 3, the ends of the pressing pistons 9 are slightly spaced from the pads. If the distance between the pads and the pistons 9 in this state is shorter than the remaining stroke of the pressing pistons 9 (distance that the pistons 9 can advance from the position shown in a normal condition), the pads will be pressed by the pressing pistons 9 should the means 7 and/or 8 be broken. In such a situation, the shorter the distance between the pads and the pistons 9 in the state shown in the figure, the smaller the amount of brake fluid needed to propel the pressing pistons, Thus, the distance between the pads and the pistons 9 in the state shown should be as short as possible, provided this does not hamper vibration detection and imparting functions of the means 7 and 8.

Also, in the embodiment of FIG. 8, rubber caps 13 are preferably put on the heads of the pressing pistons 9. The vibration detecting means 7 and the vibration imparting means 8 are retained by the rubber caps by fitting (preferably tight-fitting) them in holes formed in the rubber caps 13. With this arrangement, the means 7 and 8 can be retained in position easily, and can be protected effectively against braking torque.

The vibration detecting means 7 and the vibration imparting means 8 have wires 15 for inputting and outputting electric signals. They pass through cut grooves 5b, 9c and 13a formed in the brake pistons 5, pressing pistons 9 and rubber caps 13, and are guided to the outside.

To protect the wires 15, means are provided to prevent the rotation of the brake pistons 5 and the pressing pistons 9. That is, the brake pistons 5 are prevented from rotating by engaging pins 3b provided on the backs of the pad backing plates 3a in grooves 5c formed in the tip of the brake pistons 5. Rotation of the pressing pistons 9 is prevented by engaging pins 9b provided on flange portions provided at an intermediate portion of the pistons 9 in grooves 5a formed in the inner surface of the rear wall of the brake pistons 5.

Dust seals 14 are provided between the brake pistons 5 and the pressing pistons 9 to keep off foreign matter.

Conventional vibration dampers for disk brakes have a single vibration detecting means and a single vibration imparting means to suppress squeaks of the brake. If such a conventional vibration damper is used in a large-sized brake having a plurality of pistons for pressing each pad against the disk, it is difficult to suppress brake squeaks effectively because vibrations are detected only at one point and the disk has vibrations imparted only at one point.

Figure 10:
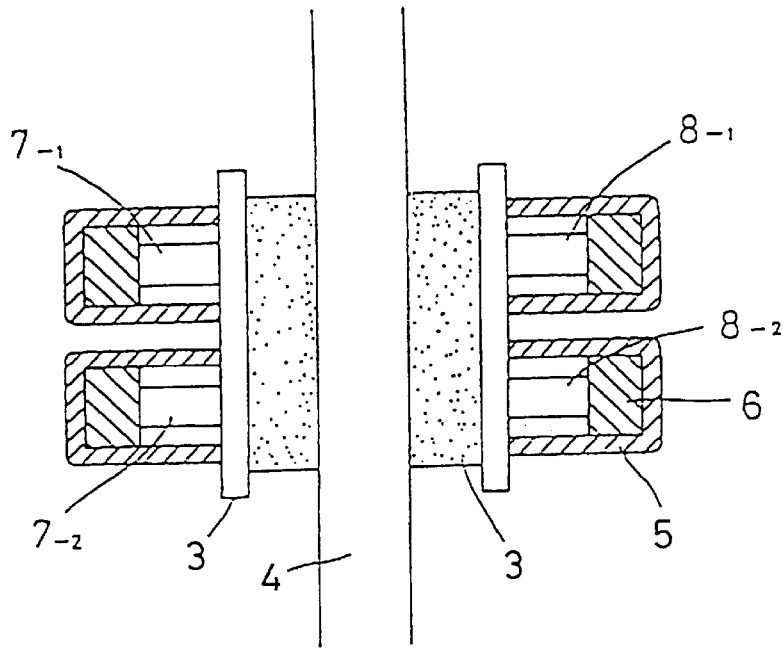
FIG. 10 is a schematic view of an eighth embodiment.

FIG. 10 shows an eighth embodiment of this invention. In the figure, the caliper of the disk brake is omitted. The disk brake includes a rotary disk 4, friction pads 3 adapted to sandwich the disk 4 from both sides, pistons 5, a first vibration detecting means 7-1, a second vibration detecting means 7-2, a first vibration imparting means 8-1 and a second vibration imparting means 8-2.

In this embodiment, the vibration detecting means 7-1, 7-2 and the vibration imparting means 8-1, 8-2 are laminated piezoelectric elements. But these means may be ones that utilize magnetic force or static electricity to detect or produce vibrations. The vibration damper of this embodiment is used in an opposed-four-piston type disc brake. That is, two pistons are provided on each side of the disk 4. As shown in FIG. 10, the vibration detecting means and the vibration imparting means are received in the respective pistons 5 so that the first vibration detecting means 7-1 is provided opposite to the first vibration imparting means 8-1, while the second vibration detecting means 7-2 is opposite to second vibration imparting means 8-2.

The means 7-1, 7-2, 8-1 and 8-2, which are piezoelectric elements, can detect vibrations and produce them by being pressed against the pads. In this embodiment they are pressed against the pads 3 by pressers 6 which are received in the respective pistons 5 and adapted to receive the piston propelling force.

The pressers 6 may be formed integral with the pistons 5 so that the piezoelectric elements are pressed directly by the pistons 5. Otherwise, the piezoelectric elements as the vibration detectors and oscillators may be pressed against the pads by pressing pistons liquid-tightly received in the respective pistons 5 and adapted to be propelled by brake fluid pressure introduced into the pistons 5 through holes formed in the rear walls of the pistons 5.

Figure 11:
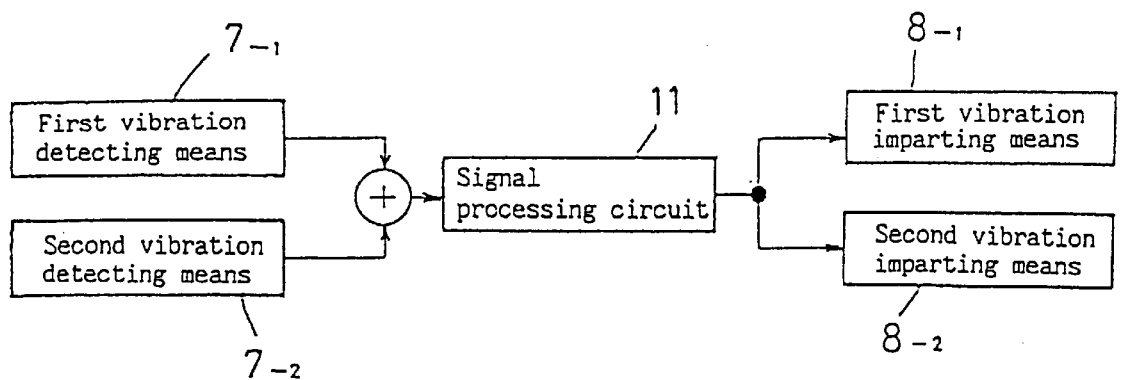
FIG. 11 is a circuit diagram of the same.

FIG. 11 shows a circuit diagram of the eighth embodiment. As shown, the sum of the detection signals from the first and second vibration detecting means 7-1 and 7-2 is entered into a signal processing circuit 11. Based on the input signal or the sum of the detection signals, the circuit 11 produces a signal for damping the vibration of the disk that causes squeaks of the brake (a signal for producing vibrations that are opposite in phase to the vibrations of the disk and capable of canceling out the vibrations of the disk). This signal is applied to the first and second vibration imparting means 8-1 and 8-2 to vibration them.

Since vibration detection signals detected by a plurality of vibration detectors are integrated or summed up before processing, it is possible to process these signals with a single signal processor 11. Also, vibrations can be damped more accurately.

The above-described concept of this invention is equally applicable to a disk brake having three pistons on each side of the disk 4. That is, it is possible to sum up vibration detection signals from three vibration detectors provided on three pistons on one side of the disk and, based on the sum of the detection signals, damp vibrations of the disk. The vibration damper of this embodiment has two vibration imparting means. But it may have a single vibration imparting means. But if the disk brake has three or more pistons on each side of the disk, the vibration damper may have three or more vibration imparting means. The vibration detecting means and the vibration imparting means may be provided on either side of the disk.

Figure 12:
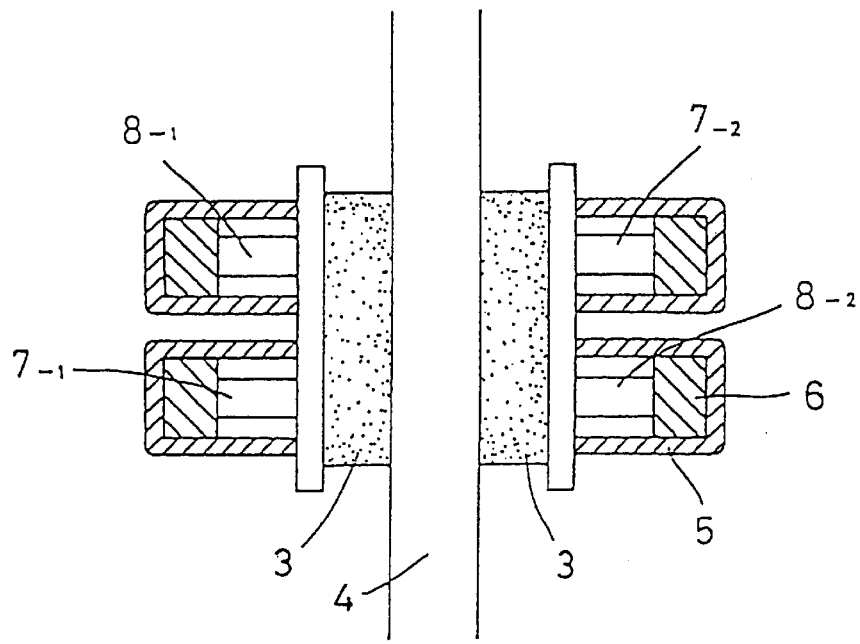
FIG. 12 is a schematic view of a ninth embodiment.
Figure 13:
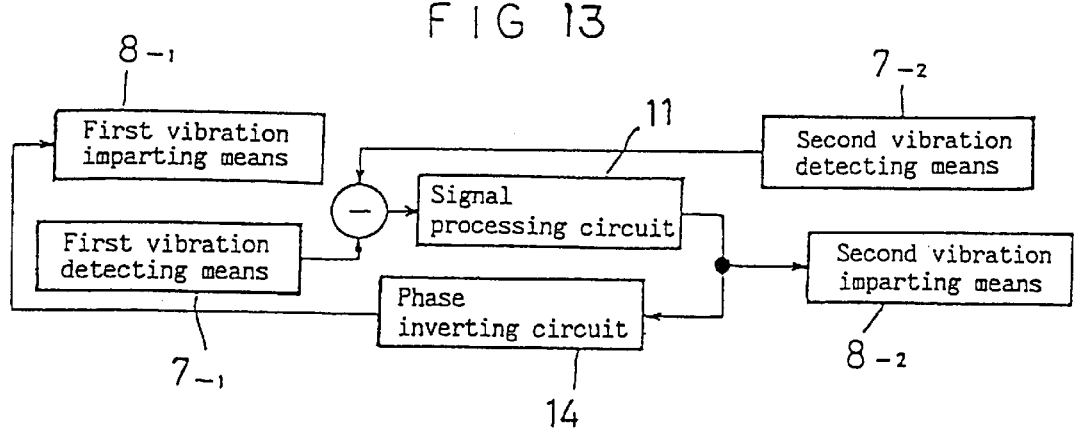
FIG. 13 is a circuit diagram of the same.

FIGS. 12 and 13 show a ninth embodiment. This embodiment differs from the eighth embodiment in that the first and second vibration detecting means 7-1 and 7-2 detects vibrations of the two pads 3 and the vibration imparting means 8-1 and 8-2 oscillate the two respective pads 13. Since the means 7-1 and 7-2 detect vibrations of two different pads, their detection signals are opposite in phase to each other. Thus, in this embodiment, one of the detection signals is subtracted from the other to obtain the same result as in the eighth embodiment, in which detection signals that represent vibrations of a single pad are added.

Also, since both pads have vibrations imparted by the individual vibration imparting means, the pad oscillating signal produced by the processing circuit 11 is applied to the first vibration imparting means 8-1 after inverting its phase with a phase inverter 14 as shown in FIG. 13, while the oscillating signal is applied directly from the circuit 12 to the second vibration imparting means 8-2. With this arrangement, vibrations of the disk can be damped as effectively as the arrangement of the eighth embodiment.

Figure 14:
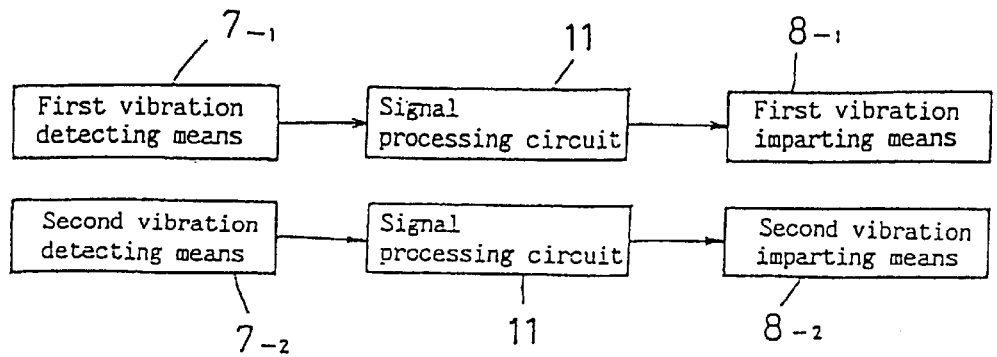
FIG. 14 is a circuit diagram of a tenth embodiment.

FIG. 14 shows a circuit diagram of a tenth embodiment. In this embodiment, the first and second vibration detecting means 7-1 and 7-2 are received in pistons on one side of the disk so as to be opposite, respectively, to the first and second vibration imparting means 8-1 and 8-2 which are received in the pistons on the other side of the disk, as shown in FIG. 10. The means 7-1 and 8-1 and the means 7-2 and 8-2 act as mutually independent vibration damper mechanisms. Although this arrangement needs two signal processing circuits 11, it is possible to damp vibrations more accurately and thus to suppress brake squeaks more effectively, because, with this arrangement, vibrations of the disk can be canceled at the same points at which the vibrations are detected through the pads.

If the points at which the disk is vibrated by the oscillators are not coincident with the points at which vibrations of the disk are detected, the vibration imparting means may impart vibrations to the pads at points where the disk is not vibrating. The arrangement of the tenth embodiment is free of this problem.

The vibration detecting means and the vibration imparting means may be provided on either side of the disk. Also, the vibration detecting means 7-1 of one of the two mutually independent vibration damper mechanisms and the vibration imparting means 8-2 of the other vibration damper mechanism may be provided on one side of the disk, with the first vibration imparting means 8-1 and the second vibration detecting means 7-2 on the other side of the disk so as to be opposite to the means 7-1 and 8-1, respectively. In this arrangement, vibrations of the disk are detected on both sides of the disk, and the disk is from both sides.

If the disk brake has three or more pistons 5 on either side of the disk, three or more mutually independent vibration damper mechanisms may be provided. The only requirement is that the vibration damper of this embodiment has a plurality of mutually independent vibration damper mechanisms each comprising a vibration detecting means and a vibration imparting means provided on opposite sides of the disk.

Figure 15:
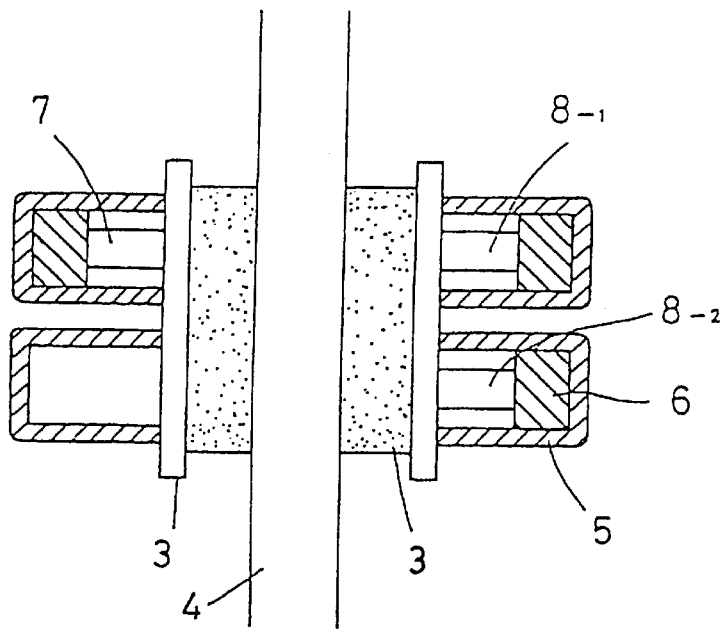
FIG. 15 is a schematic view of the same.
Figure 16:
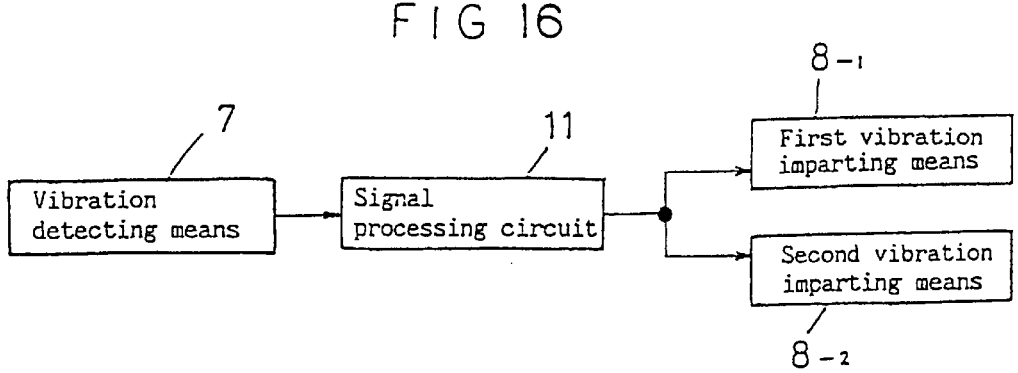
FIG. 16 is a circuit diagram of the same.

FIGS. 15 and 16 show an eleventh embodiment. The vibration damper of this embodiment comprises a single vibration detecting means 7 and a plurality of vibration imparting means 8-1 and 8-2 for imparting vibration to the disk based on detection signals from the single vibration detecting means. Since the disk is given vibration at a plurality of points, the vibration damping efficiency improves. Since vibrations are detected at one point, it is impossible to suppress squeaks as effectively as in the eighth to tenth embodiments. But the vibration damper is less expensive.

What is claimed is:

1. A disk brake assembly, comprising:
a disk brake including a disk, pads on both sides of said disk and a plurality of pistons for pressing said pads against said disk; and
a vibration damper comprising
a vibration detecting means for detecting vibrations of said disk brake through said pads and generating detection signals, and
a vibration imparting means for imparting vibrations to said pads so as to cancel out the vibrations of said disk brake based on said detection signals from said vibration detecting means;
wherein at least one of said vibration detecting means and said vibration imparting means is provided in plural; and
wherein said vibration detecting means and said vibration imparting means are received in respective said pistons.

2. The disk brake assembly of claim 1, wherein a plurality of said vibration detecting means are provided on one side of said disk, and wherein said vibration imparting means is controlled based on a signal obtained by summing said detection signals from said plurality of said vibration detecting means.

3. The disk brake assembly of claim 1, wherein a plurality of said vibration detecting means are provided so as to be on both sides of said disk, and wherein said vibration imparting means is controlled based on a difference between said detection signals from said plurality of said vibration detecting means provided so as to be on both sides of said disk.

4. The disk brake assembly of claim 1, wherein:
a plurality of said vibration detecting means and a plurality of said vibration imparting means are provided;
a plurality of vibration damper mechanisms are formed, each comprising one of said plurality of vibration detecting means and one of said plurality of vibration imparting means received in pistons of said plurality of pistons that are provided opposite to each other on both sides of said disk; and
wherein said plurality of vibration damper mechanisms are arranged so as to be operable for detecting and imparting vibrations independently of one another.

5. The disk brake assembly of claim 4, wherein each of said plurality of vibration damper mechanisms comprises an independent signal processing circuit receiving signals from the one of said plurality of vibration detecting means and sending signals to the one of said plurality of vibration imparting means.

6. The disk brake assembly of claim 1, wherein said vibration detecting means is a single vibration detecting means, a plurality of said vibration imparting means are provided, and said plurality of vibration imparting means are controlled based on said detection signals from said single vibration detecting means.

* * * * *